3,049,400
SOLVENT EXTRACTION PROCESS FOR THE SEPARATION OF URANIUM AND THORIUM FROM PROTACTINIUM AND FISSION PRODUCTS

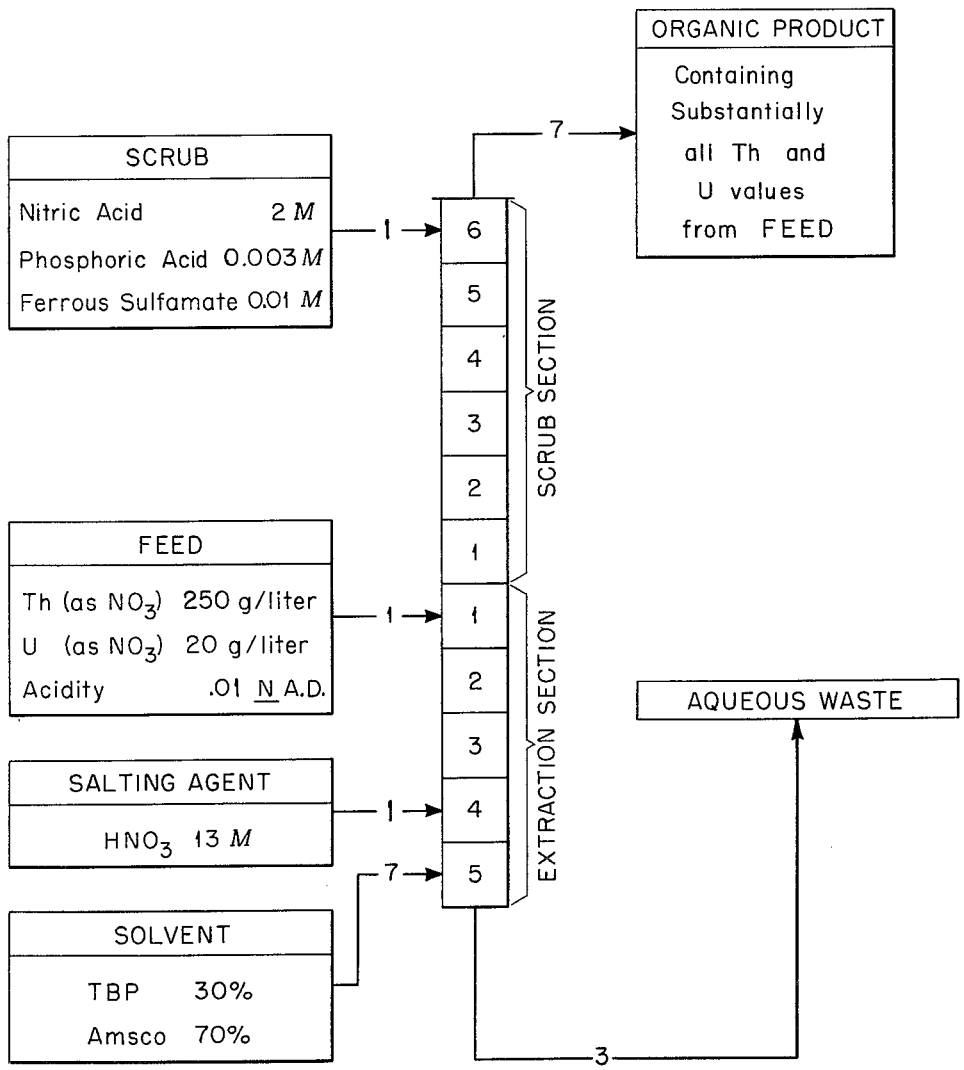

Robert H. Rainey, Knoxville, and John G. Moore, Clinton, Tenn., assignors to the United States of America as represented by the United States Atomic Energy Commission
Filed May 4, 1960, Ser. No. 26,919
9 Claims. (Cl. 23—14.5)

The present invention relates to an improved process for the solvent extraction of uranium and thorium from protactinium and nuclear fission products of uranium.

The processing of spent nuclear fuels by solvent extraction to recover fissionable and fertile values therefrom results in the accumulation of large volumes of intensely radioactive liquid wastes. For reasons of economy, public health and safety, it is highly desirable that such wastes be reduced to a minimum. An obvious expedient is to reduce the volume of such radioactive liquid compositions by evaporation and/or distillation. However, a practical limit is placed on such operations by the large content of non-volatiles in the liquid. Radioactive liquid wastes produced from processing spent reactor fuels by solvent extraction generally contain large amounts of inorganic salts which are used as salting agents to increase the solubility of desired metal values in the organic phase. A process for the separation of uranium and thorium values from neutron irradiated thorium by means of a solvent extraction process using relatively large amounts of inorganic salts as salting agent is described in a co-pending application, Serial No. 602,686, filed August 7, 1956, entitled "Process for the Separation of Protactinium, Thorium and Uranium From Neutron Irradiated Thorium," by A. T. Gresky et al., of common assignee. In this process, an aqueous solution of neutron irradiated thorium is contacted, under net nitrate ion deficient conditions, with an organic solution of a trialkylphosphate in an inert inorganic diluent, thereby perferentially extracting thorium and uranium values into the organic phase while confining protactinium and certain fission products in the aqueous phase. The resultant organic phase is then scrubbed with an aqueous solution of an inorganic nitrate salt, preferably aluminum nitrate, to remove any remaining protactinium and fission products therefrom. The organic phase is then separated from the aqueous phase and subsequently treated in accordance with well defined techniques to separate the thorium from the uranium.

The term "net nitrate ion deficient" refers to a deficiency of free nitric acid, or nitrate ions, in aqueous solutions of nitrate salts. More particularly, nitrate ion deficiency is a measure of a stoichiometric deficiency of nitrate ions in an aqueous solution containing nitrate salts where the stoichiometric deficiency is made up by hydroxyl ions. To illustrate, a 1 molar solution of thorium nitrate $Th(NO_3)_4$ can be adjusted to a .2 molar nitrate ion deficient solution by hydrolysis and evaporation of said solution under conditions to be described. The resulting solution may be considered as a mixture of .8 M $Th(NO_3)_4$ and .2 M $Th(OH)(NO_3)_3$. The general equation for acid deficient thorium nitrate is $Th(OH)_y(NO_3)_x$ where $y$ may have any value from 0 to 3 except zero and $x$ equal to $4-y$. Aluminum nitrate and other compounds form analogous hydroxy compounds.

While the above-described process achieves separation of protactinium and fission products from thorium and uranium, it is characterized by an important disadvantage which restricts its usefulness as an economical recovery process. The process referred to results in unduly large volumes of radioactive waste solutions. For example, in treating a metric ton of neutron irradiated thorium in a nitrate ion deficient extraction system by the above-described solvent extraction process it is estimated that approximately 250 gallons of radioactive waste solution containing about 2 M $Al(NO_3)_3$ will result, whereas if a volatile salting agent such as nitric acid could be used instead of aluminum nitrate to obtain usefully high decontamination factors and high uranium and thorium recoveries, it is estimated that the volume of radioactive waste could be reduced by a factor of about 10. The cost savings resulting from such volume reduction and the concomitant advantages resulting therefrom are obvious.

Solvent extraction, under net nitrate ion deficient conditions, has been employed to suppress protactinium, ruthenium and other fission product extractability into the organic phase. For example, ruthenium, zirconium, niobium, and protactinium show a marked ability to exist simultaneously in various valence states and in different forms of molecular association such as complexes and polymers, the result of which is that it is extremely difficult to confine these elements to a single phase during extraction. While the mechanism involved is not completely understood, it is probable that nitrate ion deficient conditions suppress extractability of the undesired ionic species by converting them to organic inextractable states.

Now it is known that the extraction of uranium and thorium values from aqueous solution by an organic medium is dependent upon the particular form in which they are present in solution. As their nitrates, uranium and thorium can be extracted by several organic solvents, a particularly useful one being tributylphosphate in a paraffinic hydrocarbon diluent. In a nitrate ion deficient system thorium and/or uranium exists in solution as nitrates and as hydroxy-nitrates. Hydroxy-nitrates of thorium and uranium are not extractable under the same conditions which effect extraction of thorium nitrate and uranium nitrate. It is also to be noted that in a net nitrate ion deficient extraction system the use of nitric acid as a salting out agent is necessarily precluded and restricts the choice of salting agents to metallic salts, principally aluminum nitrate. It is therefore apparent that while solvent extraction under net nitrate ion deficient conditions may result in high decontamination factors, it does so at the expense of increasing thorium and uranium losses and results in high volumes of aqueous wastes.

With the foregoing discussion in mind, it is a major object of this invention to provide, in a solvent extraction process for the separation of thorium and uranium from a neutron-irradiated thorium composition, an improvement which permits a substantial reduction in aqueous waste volumes resulting from said solvent extraction.

A general object of this invention is to provide an improved process for separating and recovering uranium and thorium values from neutron-irradiated thorium.

Another object of this invention is to provide a liquid-liquid solvent extraction process for the separation of thorium and uranium from neutron irradiated thorium in which said separation takes place with a volatile acid salting agent, the anion of which is the same as that of the inorganic compound to be extracted.

Other objects will in part be pointed out and in part be obvious from the following description.

In accordance with the present invention, uranium and thorium are separted from an aqueous nitric acid solution of neutron-irradiated thorium by adjusting said solution to a nitrate ion deficient condition to form an aqueous feed, contacting said feed solution in an extraction zone of an extraction system consisting of an extraction zone and a scrubbing zone, with an organic solution of a tri-alkylphosphate in an inert organic diluent to thereby preferentially extract uranium and thorium into the resulting organic phase while confining protactinium and fission products to the resulting aqueous phase, introducing an aqueous solution of nitric acid into said extraction zone at a late extraction stage, contacting the aqueous feed depleted with respect to its original thorium and uranium content in said late extraction stage with said nitric acid solution, contacting the organic solution enriched in its thorium and uranium content in said scrubbing zone with an aqueous scrub solution to remove fission products and residual amounts of protactinium, and separating a decontaminated organic phase containing said thorium and said uranium.

Briefly stated, by the present invention the benefits of high decontamination factors achieved in a net nitrate ion deficient system, high thorium and uranium recovery are combined into one process, while yet effecting a considerable decrease in the volume of radioactive waste solution.

The practice of our invention can achieve an excellent separation of fission products and protactinium from thorium and uranium in relatively simple, and preferably continuous solvent extraction cycle. An aqueous immiscible organic solvent such as a trialkylphosphate in proper volumetric proportion in an inert organic diluent, in combination wtih an aqueous scrub solution, sharply and efficiently extracts thorium and uranium from a nitrate solution of neutron irradiated thorium, while confining the preponderance of protactinium and fission products to the aqueous phase. The protactinium, or its daughter uranium-233, may thereafter be separated from fission products or may be permitted to remain with the fission products, and the fission product raffinate solution may be readily concentrated to a relatively small volume for convenient storage and/or recovery of individual radioisotopes.

The recovery of the fissionable uranium-233 product and the fertile thorium-232 in accordance with the process to be more fully described hereinafter, allows for a significant improvement in the efficiency of conducting a thorium breeding cycle. A description of the problems involved in extracting useful energy from a thorium breeding cycle from breeder reactors is described in an article by A. M. Weinberg in the January 1960, issue of Scientific American, pp. 82–94.

In order to practice our invention a solution of neutron irradiated thorium must first be obtained. Thorium in the form of metal or an alloy thereof or as a compound such as thorium oxide, thorium carbide, or other suitable thorium compound, is exposed to the neutron flux of a nuclear reactor. A common form of thorium, as used in the present stage of the breeder program, may consist of thorium metal or a thorium-oxide composition clad with aluminum or stainless steel for use in a heterogeneous nuclear reactor. After the aluminum-clad element has been exposed to a predetermined neutron flux it is removed from the reactor and dissolved, for example, by removing the aluminum cladding with a caustic sodium nitrate solution and then dissolving the thorium with an aqueous mineral acid, generally nitric acid. In order to enhance the dissolution rate a catalytic amount of fluoride ions may be provided in the dissolution medium. A stoichiometric amount of a complexing agent is then added to the dissolution medium in order to complex the fluoride, since the presence of free fluoride ions may pose a corrosion problem to plant equipment in subsequent processing. The thorium may also exist as an aqueous slurry of thorium oxide in which case a thorium nitrate solution may be readily formed by addition of a nitric acid solution containing a fluoride catalyst.

After dissolving the neutron irradiated thorium, the resultant solution is then adjusted to a nitrate ion deficient condition. A nitrate ion deficient thorium nitrate solution may be conveniently achieved by evaporating the solution of thorium nitrate at or near its boiling point for a period of time sufficient to remove any free nitric acid in solution and at least a portion of the nitric acid formed by partial hydrolysis of the thorium nitrate and other nitrate salts. In like manner the acid may be removed by steam stripping techniques. The residue is then adjusted to a desired concentration by adding the required amount of water. Generally, a nitrate ion deficiency of 0.10 to 1.0 molar is satisfactory in order to achieve high decontamination of protactinium and harmful fission product activities; it is preferred, however, to operate with a nitrate ion deficiency of approximately 0.15 molar. The nitrate ion deficient solution is then contacted with a trialkylphosphate-organic diluent solution. The trialkylphosphate employed should be a liquid at the ambient temperature and should preferably comprise 4 to 5 carbon atoms in each of its alkyl radicals. A suitable extractant is tri-n-butylphosphate (hereinafter referred to as "TBP"). The organic diluent should be an inert hydrocarbon having a density distinctly different from that of the aqueous solution in order to provide rapid separation of the organic phase from the aqueous phase. Saturated hydrocarbons, especially kerosene fractions containing 10–12 carbons, are particularly suitable diluents. Upon contacting the nitrate ion deficient aqueous feed solution with the organic extractant, the thorium and uranium values are selectively extracted into the organic phase.

In order to increase the distribution coefficient for thorium and uranium still further and thus decrease the loss of these values to the aqueous raffinate, we employ an aqueous nitric acid solution which serves to further enrich the organic phase with thorium and uranium. The nitric acid solution is introduced into the extraction zone at a late extraction stage between the extraction stage where the nitrate ion deficient solution is introduced and the extraction stage used for introduction of the organic phase. For best results the nitric acid used should be concentrated, say in the range 13 to 16 molar, although lesser concentrations have also been found useful, except that larger volumes of the lesser acid concentrations are required.

After solvent extraction, the organic phase is then contacted with an aqueous scrubbing solution in order to effect further decontamination. Enhanced protactinium and zirconium-niobium decontamination factors are attained if the scrub solution includes a small amount of phosphate ions. The addition of a small amount of a soluble source of sulfite or bisulfiite ions to the nitrate ion deficient feed solution has been found to increase the ruthenium decontamination factor. This feature is more fully described in U.S. Patent 2,909,406. If the aqueous feed contains any chromium impurity, a small amount of ferrous iron added to the scrub solution prevents extraction of chromium into the organic phase.

The aqueous raffinate stream from the extraction cycle contains virtually all of the protactinium and fission products. The protactinium may then be separated from the fission products if its individual recovery is desired. Several methods for the separation of the protactinium from fission products, none of which form a part of this invention, may be employed. One method which has been used is selective sorption on common inorganic adsorbents such as silica gel, followed by elution therefrom. On the other hand, it may be permitted to decay to uranium-233 which can then be recovered by known solvent extraction techniques.

The organic extract leaving the extraction column, which now contains thorium and uranium and is now substantially decontaminated, as compared to its original content of fission product and protactinium, and can then be treated, in accordance with well defined techniques, to separate the thorium from the uranium into forms which can be reused in a nuclear reactor.

To effect extraction the aqueous nitrate ion deficient feed solution is contacted preferably continuously and countercurrently with the organic extractant. Virtually any conventional solvent-extraction contacting means, such as a separatory funnel, mixer-settler, or packed columns, may be employed. For large scale operations, pulse columns wherein the column contents are periodically and sequentially surged upwardly and downwardly have been found to be particularly efficient.

In the examples to be described the various liquid streams were contacted in a series of mixer-settlers designed for batch countercurrent contact of the aqueous streams with the organic solvent. The series comprised an extraction section and a scrub section. Each mixer-settler closely approximates a theoretical stage. A series of units are required to demonstrate the process.

A nitrate ion deficient aqueous feed solution was introduced into the first extraction stage at a volume ratio of 1.0. The term "volume ratio" is used to indicate the relative volume, in arbitrary units, of various process streams, assigning a value of 1 to the feed stream, or if the extraction is carried out in a continuous system, the relationship will be a comparison of the relative flow ratios.

In the extraction section, a stream of nitric acid was introduced in contact with the aqueous phase at a late extraction stage. As the aqueous phase passes through each extraction section, it continuously gives off thorium and uranium to the organic solvent phase, aided by the salting action of the nitric acid, and continuously comes in contact with solvent containing less and less thorium until it reaches the extraction stage at which fresh solvent is introduced to the system. At this point the thorium and uranium depleted aqueous phase leaves the system.

In the scrub section an aqueous scrub was contacted and mixed with the thorium and uranium laden organic solvent, washing fission products and protactinium out of the solvent. The aqueous scrub was disengaged from the solvent; this contacted aqueous scrub was cascaded into the extraction zone.

Having described a typical extraction cycle, we will now provide a number of examples to illustrate the effect of various process variables on the decontamination and recovery of thorium and uranium from an aqueous thorium-containing feed in which the principal contamination is due to protactinium and the principal gamma-emitting fission products, ruthenium, zirconium and niobium.

In the examples below, a laboratory scale test of the process using small scale equipment was employed. It will be readily apparent, however, that these examples illustrate the applicability of this invention to large scale work.

*Example I*

In order to test the effect of varying the principal process variables, we define a standard flow sheet. The characteristics of the standard flow sheet are indicated in Table I below.

The standard flow sheet was operated in an extraction system described above containing five extraction stages and six scrub stages, with the 13 molar nitric acid being introduced into the extraction system at the fourth extraction stage. Using the standard flow sheet as the reference point, the scrub acidity, feed acidity, amount of bisulfite in the feed, and the volume of salting acid were varied independently to determine the effect on the various decontamination factors. The results are summarized in Table I below.

TABLE I

| Standard flow sheet | Relative volume | Activity of feed in standard flow sheet |
|---|---|---|
| Feed: 250 g./l Th, 20 g./l U, 0.1 N AD, 10.02 M NaHSO₃. | 1 | Ru 5 × 10³ c./m./mg. Th. |
| Scrub: 2 M HNO₃, 0.01 M Fe(NH₂SO₃)₂, 0.003 M H₃PO₄. | 1 | Zr-Nb 8 × 10⁴ c./m./mg. Th. |
| Acid: 13 M HNO₃ | 1 | Pa 2 × 10⁴ c./m./mg. Th. |
| Extractant: 30% TBP-Amsco | 7 | (Gross 1.5 × 10⁴ c./m./mg. Th). |
| Stages: 5 extraction, 6 scrub | | |

| Flowsheet variables | Decontamination factor | | | | Th loss, percent |
|---|---|---|---|---|---|
| | Gross γ | Ru | Zr-Nb | Pa | |
| Standard | 3,000 | 700 | 3,000 | 500 | .03 |
| Scrub, acidity: | | | | | |
| 4 M HNO₃ | 50 | 2,000 | 450 | 11 | .05 |
| 3 M HNO₃ | 350 | 1,500 | 1,100 | 60 | .05 |
| 2 M HNO₃ | 3,000 | 700 | 3,000 | 500 | .03 |
| 1 M HNO₃ | 3,000 | 550 | 3,000 | 1,200 | .03 |
| 0.5 M HNO₃ | 700 | 1,000 | 21,000 | 160 | .1 |
| H₂O | 1,400 | 900 | 17,000 | 190 | .3 |
| Feed, acidity: | | | | | |
| 0.07 M HNO₃ | 40 | 30 | 600 | | .5 |
| 0.01 M HNO₃ | 400 | 30 | 600 | | .4 |
| 0.14 N AD¹ | 3,000 | 700 | 3,000 | 500 | .03 |
| 0.34 N AD¹ | 3,000 | 800 | 5,000 | 1,000 | .03 |
| Feed, bisulfite: | | | | | |
| None | 2,000 | 100 | 3,500 | 700 | .03 |
| 0.02 M | 3,000 | 700 | 3,000 | 500 | .03 |
| 0.05 M | 4,500 | 2,000 | 7,000 | 1,200 | .09 |
| 0.10 M | 700 | 2,000 | 7,000 | 100 | .05 |
| Salting acid, volume: | | | | | |
| 2 volumes | 3,000 | 700 | 3,000 | 600 | .03 |
| 1 volume | 3,000 | 700 | 3,000 | 500 | .03 |
| 0.5 volume | 5,000 | 700 | 8,000 | 1,300 | .3 |
| None | 11,000 | 8,000 | 23,000 | 2,100 | 23. |

¹ AD = Nitrate ion deficiency.

In all cases uranium loss to the aqueous waste was below analytical detection. As used herein the term "decontamination factor" means $$\frac{c./m./mg. \text{ Th in product}}{c./m./mg. \text{ Th in feed}}$$

where c./m./mg. Th = counts per minute per milligram thorium.

From the results shown in Table I, the advantage of operating with a nitrate ion deficient feed solution will be obvious. In the case where the feed solution was not in a nitrate ion deficient condition the decontamination factor was reduced to an impractically low level.

The results of Table I also demonstrate clearly that usefully high decontamination factors for the troublesome nuclear poisons (ruthenium, zirconium, niobium, and protactinium) can be achieved under acid extraction conditions using a nitrate ion deficient feed, while at the same time obtaining quantitative recovery of uranium and thorium.

To aid in the further understanding of this invention reference is now made to the accompanying flow sheet which describes the processing of an aqueous solution containing 250 grams of thorium and 20 grams of uranium per liter, said solution having an acid deficiency of 0.1 normal. A feed solution of this composition containing fission products was extracted with seven volumes of 30% tributyl phosphate in Amsco (a saturated hydrocarbon). Prior to solvent extraction the feed is treated with a solution of sodium bisulfite to decrease fission product extraction. The pregnant solvent is then scrubbed with 2 molar nitric acid containing traces of phosphate ions and ferrous sulfamate to decrease extraction of zirconium, niobium and chromium. Five extraction and six scrub stages are used. The nitric acid scrub containing phosphate ions and ferrous sulfamate, is introduced at the top of the cascade. Since the self-salting strength of thorium decreases as its concentration decreases, 1 volume of 13 molar nitric acid is added to the fourth extraction stage to decrease the loss of the thorium in the aqueous phase. The average decontamination factors for the extraction cycle-scrub system shown was 700, 3000, and 500 for ruthenium, zirconium-niobium, and protactinium, respectively. The thorium loss was about 0.03%. Following this extraction-scrub cycle, the thorium and uranium may be stripped from the organic phase either simultaneously or separately by use of established procedures.

As previously noted, the nitric acid salting agent was introduced in the fourth extraction stage in a system containing six extraction stages. The exact stage of introduction will vary with the particular extraction system used, but in all cases the salting agent should be introduced at a late extraction stage, where the aqueous phase is already depleted with respect to thorium, i.e., where the self-salting strength of thorium nitrate is minimal. The self-salting strength will be minimal where the aqueous phase contains less than about 10 grams of thorium per liter of solution. In no case, however, should the nitric acid be introduced in the last extraction stage, i.e., where the organic solvent is introduced. We have found that the fission product decontamination factors are reduced when the salting acid is introduced into the extraction zone at the same extraction stage where incoming organic solvent is introduced.

A number of significant advantages may be realized from the practice of our invention. Since the salting out agent, nitric acid, is volatile, it may be recovered and reused, rather than disposed to storage tanks, thus effecting a substantial savings. Most important, however, the reduction in volume of highly radioactive aqueous waste resulting from the use of a volatile salting agent will be considerable in comparison with a process which employs a non-volatile salting agent, such as aluminum nitrate.

*Example II*

In order to determine the conditions of steady state operation, the various stages of the standard flow sheet of Example I were sampled for thorium and nitric acid content. The system came to a steady state with concentrations and flow ratios as indicated in Table II below.

TABLE II

| Stage | Thorium (grams per liter) | | | | Ext. factor | Acid | | | Ext. factor |
| --- | --- | --- | --- | --- | --- | --- | --- | --- | --- |
| | Relative volume (org./aq.) | Org. | Aq. | Dist. coef. | | Org. | Aq. | Dist. coef. | |
| 6 scrub | 7 | 34.6 | 40.6 | .83 | 5.8 | 0.29 | 1.94 | 0.15 | 1.05 |
| 4 scrub | 7 | 41.7 | 57.8 | .72 | 5.04 | 0.28 | 1.94 | 0.14 | 0.98 |
| 2 scrub | 7 | 42.8 | 60.0 | .71 | 4.97 | 0.27 | 1.96 | 0.14 | 0.97 |
| 1 ext | 3.5 | 42.8 | 62.8 | .68 | 2.21 | 0.25 | 1.80 | 0.14 | 0.49 |
| 3 ext | 3.5 | 4.27 | 0.44 | 9.8 | 34.4 | 0.75 | 3.72 | 0.20 | 0.71 |
| 5 ext | 2.33 | 0.18 | 0.17 | 1.05 | 2.45 | 0.89 | 4.58 | 0.20 | 0.45 |

It will be noted that the extraction factor for thorium remains quite high even in the fifth extraction stage, where the thorium concentration in the aqueous phase is quite low. A particularly significant point to be noted is that the nitric acid is undergoing reflux in the extraction section, thus deriving maximum salting benefit from the nitric acid.

In the examples, an organic phase consisting of 30% TBP by volume was used. It will be understood that other TBP concentrations may also be used without departing from the scope of this invention. With lower TBP concentrations, other factors being equal, the thorium losses and decontamination factors will increase; with higher TBP concentrations the thorium losses and decontamination factors will decrease. It should also be understood that other organic diluents such as TBP in decalin may also be used in accordance with the scope of this invention. It should be further understood that this invention is not restricted to the use of a particular organic extractant, such as tri-n-butylphosphate, but can be used with advnatage with other selective organic extractants for thorium and uranium. For example, a useful class of organo-phosphorus compounds for use as a selective extractant for thorium and uranium is described in U.S. Patent 2,864,668.

Since many embodiments may be made of the invention hereinbefore described and since many variations of this invention may occur to those skilled in the art, it will be clearly understood that the scope of this invention is not to be limited to the particulars disclosed therein, but is to be defined by the following claims.

What is claimed is:

1. In a process for recovering thorium and uranium values from a neutron-irradiated thorium composition by forming a nitrate ion-deficient aqueous solution from said composition and contacting said solution with an aqueous immiscible organic solvent in a liquid-liquid extraction system containing a first end extraction stage for introduction of said aqueous nitrate ion-deficient solution, a second end extraction stage for introduction of said organic solvent into said system and a plurality of intermediate extraction stages, whereby said values are selectively extracted into said organic solvent, the improvement in said process which comprises introducing an aqueous solution of salting nitric acid into any intermediate extraction stage of said system, contacting said nitric acid solution with the solvent in said intermediate and succeeding extraction stages, and thereafter disengaging the thus contacted thorium and uranium containing solvent at a point preceding the first end extraction stage of said system.

2. The process according to claim 1 wherein the contration of said salting is about 13 molar.

3. The process according to claim 1 wherein the aqueous immiscible organic solvent is tri-n-butylphosphate in an inert organic diluent.

4. In a liquid-liquid extraction process for recovering thorium and uranium values from a neutron-irradiated thorium composition by forming a nitrate ion-deficient aqueous solution from said composition and counter-currently contacting said solution with an aqueous immiscible organic solvent in a liquid-liquid extraction system containing a plurality of extraction stages divided into a first end extraction stage wherein said nitrate ion-deficient solution is introduced into said system, a plurality of intermediate extraction stages and a second end extraction stage for introduction of said organic solvent into said system, and a plurality of scrub stages preceding said first end extraction stage, the improvement in said process which comprises introducing an aqueous salting solution of nitric acid into any intermediate extraction stage of said system, counter-currently contacting said salting nitric acid solution with the solvent in said intermediate and succeeding extraction stages, passing the thorium and uranium enriched solvent from each of said intermediate extraction stages to the first end extraction stage and thence to said scrub stages in countercurrent contact therein with an aqueous scrub to decontaminate said enriched solvent of residual amounts of fission products and protactinium, cycling the thus contacted aqueous scrub to join the aqueous phase in said extraction stages and thereafter disengaging the decontaminated and thorium and uranium enriched solvent from the scrub stages and the protactinium and fission product-containing aqueous raffinate from said extraction stages.

5. The method according to claim 4 wherein the aqueous scrub is selected from the group consisting of water and an aqueous solution of nitric acid, said solution being no greater than about 4 molar in nitric acid.

6. In a liquid-liquid extraction process for recovering thorium and uranium values from a neutron-irradiated thorium composition from a solvent extraction system containing, in sequence, a scrub zone, a first end extraction stage for introducing into said system an aqueous feed containing said values, a plurality of intermediate extraction stages and a second end extraction stage for introducing into said system an aqueous immiscible selective organic solvent for said values in countercurrent contact therein with said aqueous feed, the improvement which comprises introducing a nitrate ion deficient aqueous solution containing said values into said first end extraction stage wherein said acid deficient feed is in countercurrent contact with said solvent entering said system from said second end extraction stage, introducing an aqueous nitric acid salting solution into any of said intermediate extraction stages in contact therein with said counterflowing organic solvent, passing said organic solvent past said first end extraction stage into said scrub zone in countercurrent contact therein with an aqueous scrub solution to remove residual fission products and protactinium from the, by now, thorium and uranium-laden solvent, and thereafter disengaging the resultant decontaminated and thorium and uranium-laden solvent from said scrub zone and disengaging the resultant protactinium and fission product-laden aqueous raffinate from said extraction system.

7. The process according to claim 6 wherein the contacted aqueous scrub is cycled to the extraction section of said system.

8. The process according to claim 6 wherein the nitrate ion-deficient solution is in the range 0.10 to 1 molar.

9. The process according to claim 6 wherein the aqueous immiscible solvent is a solution of tri-n-butylphosphate in an inert organic diluent.

References Cited in the file of this patent

UNITED STATES PATENTS

| | | |
|---|---|---|
| 2,897,046 | Bohlmann | July 28, 1959 |
| 2,909,406 | Meservey et al. | Oct. 20, 1959 |
| 2,943,923 | Morgan | July 5, 1960 |

OTHER REFERENCES

Gresky: "U.N. Int. Conf. on Peaceful Uses of Atomic Energy," vol. 9, pp. 505–510 (1955).

Bruce: TID–7534, book I, pp. 180, 204–222, May 25, 1957.

Cooper et al.: "2nd U.N. Int. Conf. on Peaceful Uses of Atomic Energy," vol. 17, pp. 291–323, Sept. 13, 1958.

"Reactor Fuel Processing," pp. 15, 36, July 1960.

UNITED STATES PATENT OFFICE
CERTIFICATE OF CORRECTION

Patent No. 3,049,400                              August 14, 1962

Robert H. Rainey et al.

It is hereby certified that error appears in the above numbered patent requiring correction and that the said Letters Patent should read as corrected below.

Column 3, line 38, after "in" insert -- a --; line 42, for "wtih" read -- with --; column 6, TABLE I, above the double line, column 3, lines 5 and 6 thereof, for "(Gross $1.5 \times 10^4$ c./m./mg. Th)" read -- (Gross $1.5 \times 10^5$ c./m./mg. Th) --; same column 6, lines 48 and 49 should appear as shown below instead of as in the patent:

$$\frac{\text{c./m./mg. Th in feed}}{\text{c./m./mg. Th in product}}$$

same column 6, line 67, after "aqueous" insert -- feed --; column 8, lines 10 and 11, for "advnatage" read -- advantage --; line 43, after "salting" insert -- nitric acid --.

Signed and sealed this 30th day of April 1963.

(SEAL)
Attest:

ERNEST W. SWIDER
Attesting Officer

DAVID L. LADD
Commissioner of Patents